United States Patent [19]
Coutant et al.

[11] Patent Number: 5,682,315
[45] Date of Patent: Oct. 28, 1997

[54] METHOD AND SYSTEM FOR CONTROLLING A SPLIT TORQUE TRANSMISSION

[75] Inventors: Alan R. Coutant, Chillicothe; Michael G. Cronin, Peoria; Jerry D. Marr, Metamora; Sanjay Rajagopalan, Peoria, all of Ill.

[73] Assignee: Caterpillar Inc., Peoria, Ill.

[21] Appl. No.: 455,322

[22] Filed: May 31, 1995

[51] Int. Cl.⁶ .......................... G06G 7/70; G16H 47/04
[52] U.S. Cl. .......................... 364/424.086; 364/424.08; 364/424.085; 475/74; 475/76; 475/78; 475/80; 477/68; 477/69; 60/414; 60/437; 74/393; 74/730.1
[58] Field of Search .................. 364/424.1, 424.07, 364/424.01, 424.08, 424.086, 424.081, 424.087, 424.085; 180/6.44, 6.7, 6.48, 165; 477/68, 69, 52; 475/78, 80, 76, 79, 82, 81, 19, 74–77, 218; 60/431, 449, 414, 437, 490; 74/720, 565, 393, 730.1

[56] References Cited

U.S. PATENT DOCUMENTS

| | | |
|---|---|---|
| 4,024,775 | 5/1977 | Anderson et al. .................. 475/78 |
| 4,043,227 | 8/1977 | Beals et al. .................. 477/69 |
| 4,355,509 | 10/1982 | Fulkerson et al. .................. 74/687 |
| 4,475,637 | 10/1984 | Oguma et al. .................. 192/358 |
| 5,129,867 | 7/1992 | Fredriksen et al. .................. 475/79 |
| 5,156,577 | 10/1992 | Fredriksen et al. .................. 475/74 |
| 5,207,736 | 5/1993 | Fredriksen .................. 477/69 |
| 5,473,541 | 12/1995 | Ishino et al. .................. 364/424.07 |
| 5,477,454 | 12/1995 | Ishino et al. .................. 364/424.07 |
| 5,477,455 | 12/1995 | Ishino et al. .................. 364/424.07 |

*Primary Examiner*—Jacques Louis-Jacques
*Attorney, Agent, or Firm*—Calvin E. Glastetter

[57] ABSTRACT

The present invention relates to a method and system for controlling a split torque transmission having a hydrostatic transmission and a mechanical transmission. The control system employs a transmission control and includes a transmission input speed sensor, a transmission output speed sensor, a motor speed sensor, a speed input mechanism, a direction control mechanism, and a range selector mechanism. A microprocessor including a fuzzy controller controls the transmission in response to a input from the speed sensors and the speed input mechanism, the direction control mechanism and the range control mechanism.

4 Claims, 3 Drawing Sheets

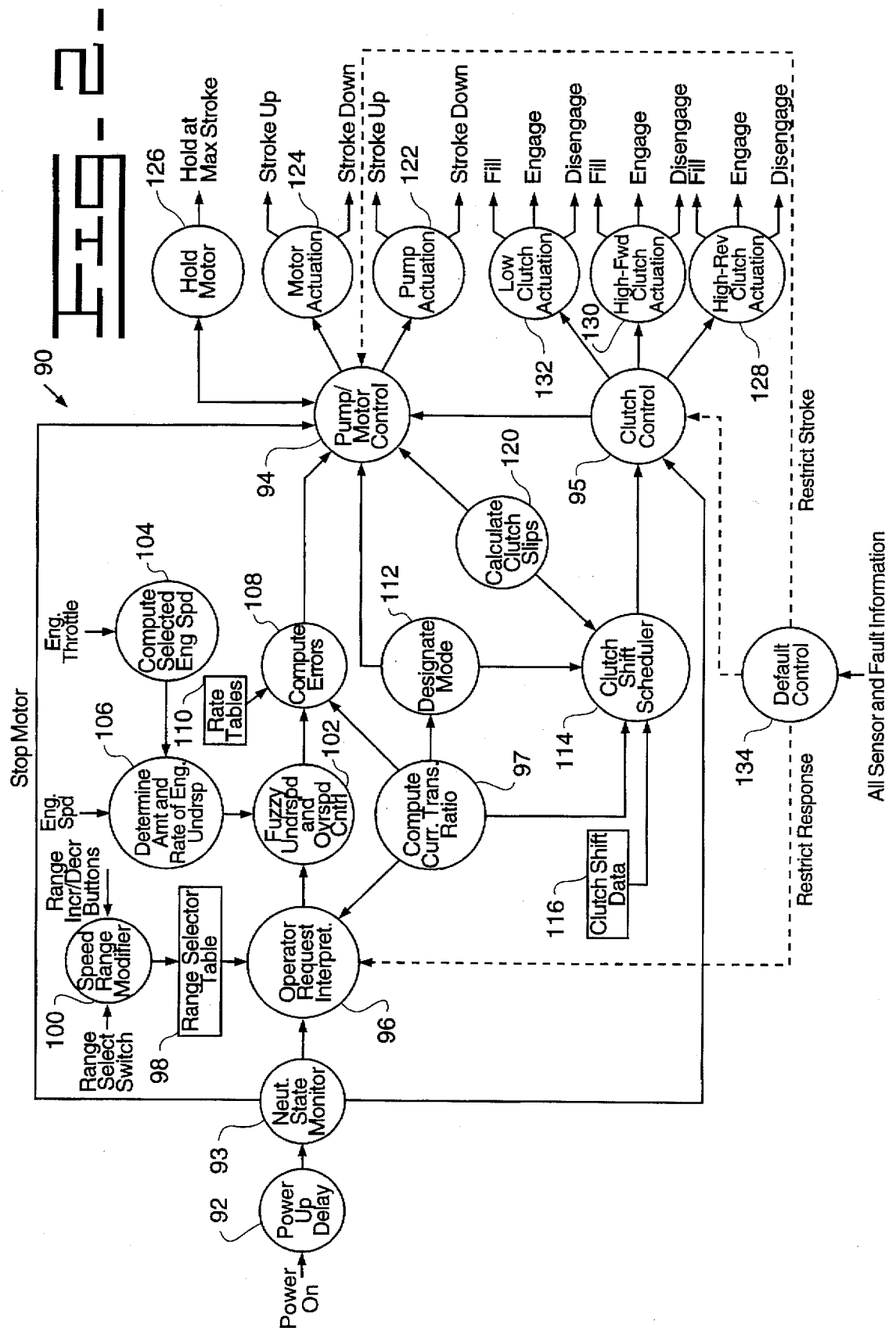

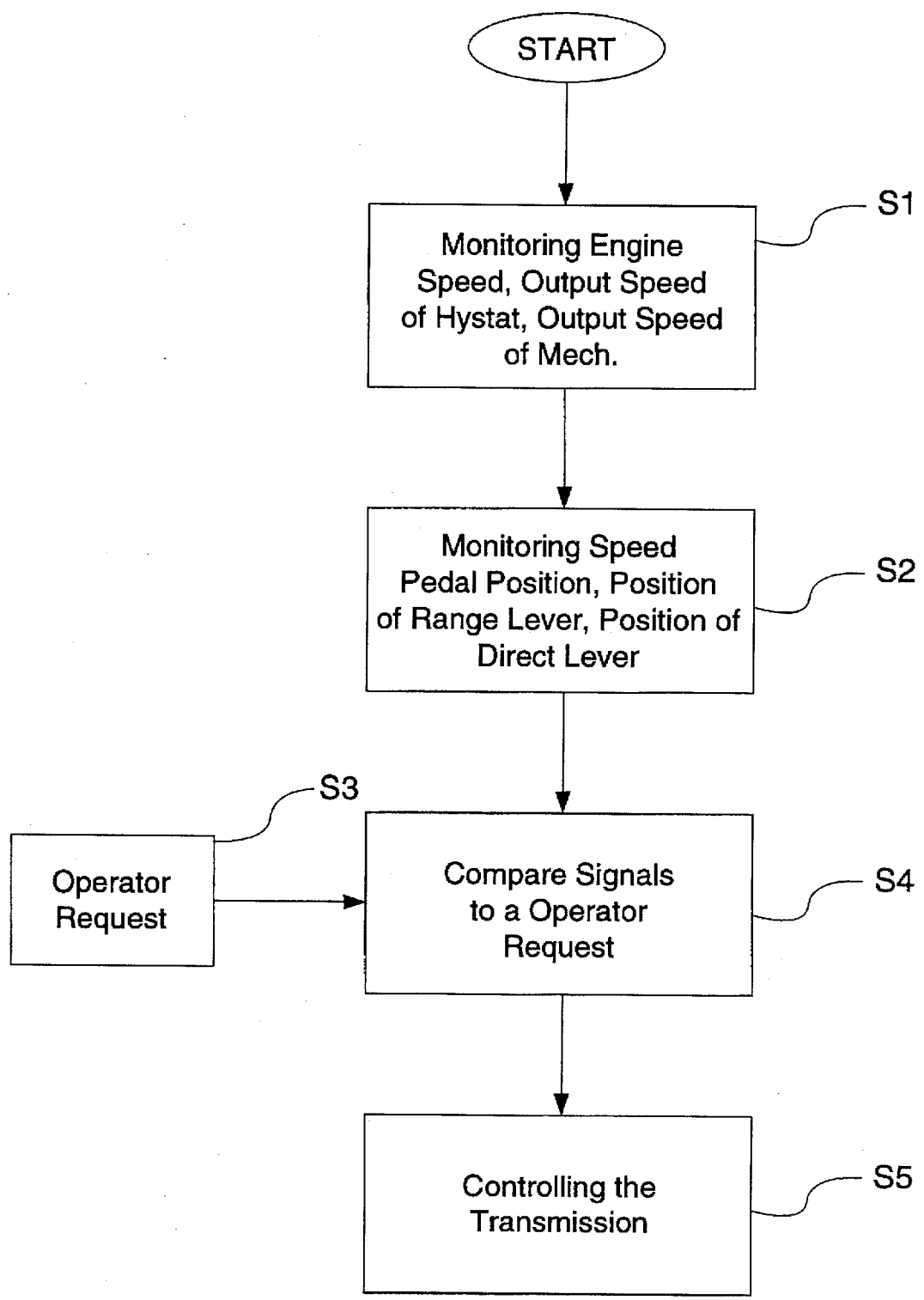

METHOD AND SYSTEM FOR CONTROLLING A SPLIT TORQUE TRANSMISSION

TECHNICAL FIELD

This invention relates generally to a split torque transmission system and more particularly to a control system and method of controlling the smooth and efficient operation of the split torque transmission.

BACKGROUND ART

In known systems, the split torque transmission control does not have feedback to the system to modify the operator inputs. Consequently, the operator inputs control the operation of the transmission and are not modified or changed when conditions within the system change. Many times it is desirable to have the operator inputs modified or changed automatically when the engine starts to lug down or for operator comfort. It is likewise beneficial to modify or control the operator inputs to determine the amount of power that is routed from the engine to the transmission output shaft and to determine optimal torque paths through the transmission.

DISCLOSURE OF THE INVENTION

In one aspect of the present invention a method is provided for controlling a split torque transmission having a hydrostatic transmission and a mechanical transmission. The method includes the steps of monitoring the tranmission input speed, the output speed of the hydrostatic transmission, the output speed of the mechanical transmission. The method further includes the steps of monitoring the position of the speed pedal, the position of the range selector lever, the position of the directional control lever, controlling the hydrostatic transmission and mechanical transmission in response to the monitored speeds and the position of the speed pedal and the position of the selector lever and the directional control lever.

The present invention provides a method which monitors various speeds of the transmission and various operator inputs to control the operation of the hydrostatic transmission and mechanical transmission to provide a continuously variable transmission and determines the amount of power that is routed from the engine to the transmission output. The control also determines the optimal torque path by engaging and disengaging the appropriate clutch.

BRIEF DESCRIPTION OF THE DRAWINGS

FIG. 2 is a flow chart of the overall operation of the transmission controller according to the present invention.

FIG. 3 is a flowchart describing the method for carrying out the invention.

BEST MODE FOR CARRYING OUT THE INVENTION

Figure 1:
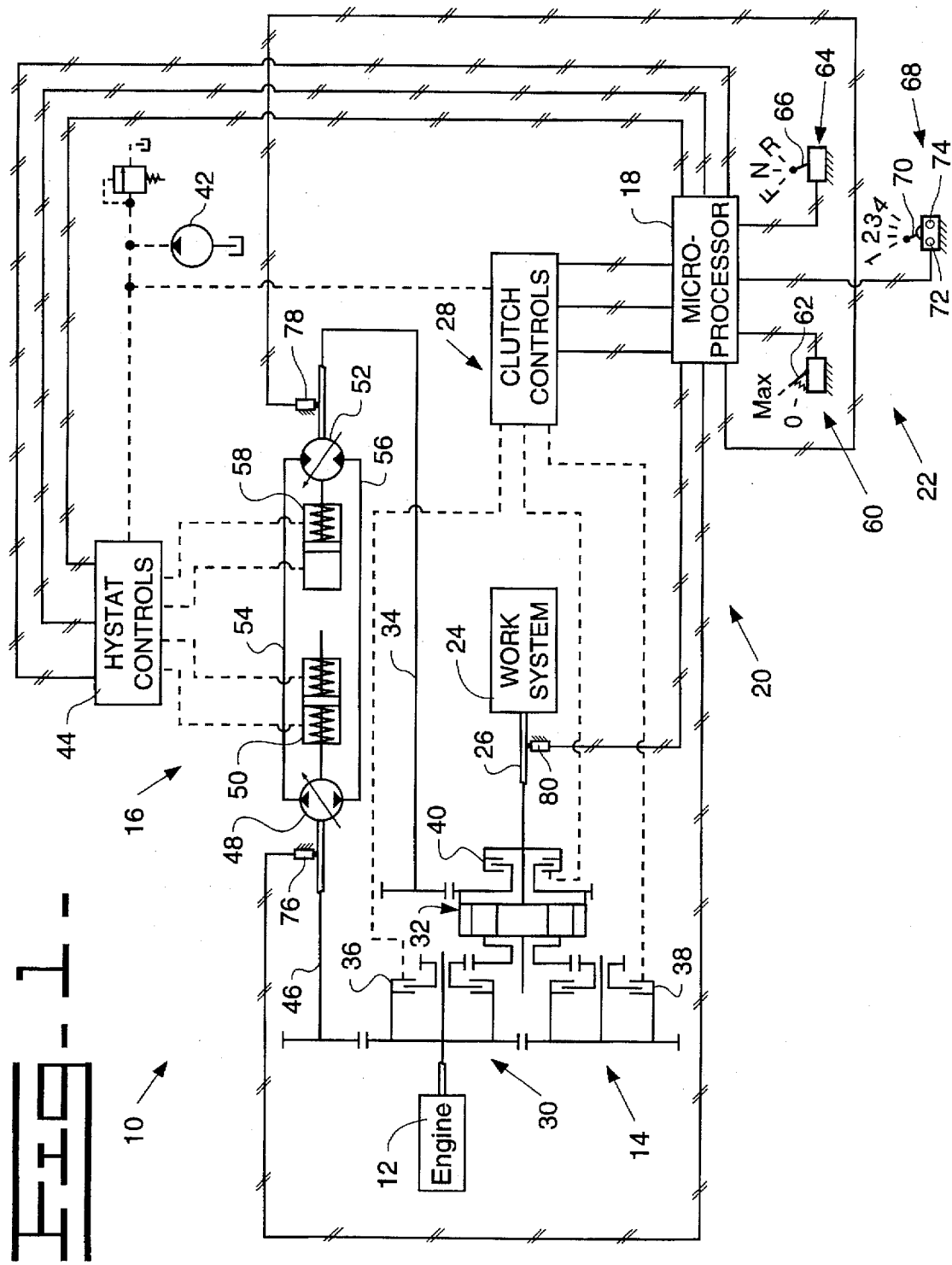
FIG. 1 is a diagrammatic illustration of a split torque transmission utilizing the subject invention.

A transmission system 10 is shown for use in a machine (not shown) having an engine 12. The split torque transmission system 10 includes a mechanical transmission 14, a hydrostatic transmission 16, a microprocessor 18, a sensing arrangement 20 and a command input arrangement 22. A work system 24 is connected to the split torque transmission 10 by a final drive shaft 26.

The mechanical transmission 14 and an associated clutch control arrangement 28 is operatively connected to the engine 12 through a gear arrangement 30. The mechanical transmission 14 includes a summing planetary arrangement 32 operatively connected to both the engine 12 through the gear arrangement 30 and to the hydrostatic transmission 16 through a motor output shaft 34. The output of the summing planetary arrangement 32 is connected to the final drive shaft 26. The mechanical transmission 14 also includes directional high speed clutches 36, 38 and a low speed clutch 40. The clutch control arrangement 28 is connected to a source of pressurized pilot fluid, such as a pilot pump 42 and the microprocessor 18 and is operative in response to electrical signals from the microprocessor 18 to control engagement and disengagement of the respective speed clutches 36, 38 and 40.

The hydrostatic transmission 16 and an associated hydrostatic control arrangement 44 is operatively connected to the engine 12 through a pump input drive shaft 46. The hydrostatic transmission 16 includes a variable displacement pump 48, a pump displacement controller 50, a variable displacement motor 52 fluidly connected to the variable displacement pump 48 by conduits 54, 56, and a motor displacement controller 58. The hydrostatic control arrangement 44 is connected to the pilot pump 42 and the microprocessor 18 and is operative in response to electrical signals from the microprocessor 18 to control movement of the respective pump and motor displacement controller 50, 58.

The command input arrangement 22 includes a speed input mechanism 60 having a speed pedal 62 moveable from a maximum speed position to a zero speed position, a direction control mechanism 64 having a direction control lever 66 selectively moveable from a neutral position to a forward or a reverse position, and a speed range control mechanism 68 having a speed lever 70 selectively moveable between a first position and a fourth position. A range increment button 72 and a range decrement button 74 are provided to modify the maximum allowable speed in each range. The speed range control machanism could be continuously moveable from a minimum position to a maximum position without having specified positions, without departing from the scope of the invention.

The sensing arrangement 20 includes a first speed sensor 76 operative to sense the speed of the transmission input 46 and the pump input shaft 46 and direct an electrical signal representative thereof to the microprocessor 18. A second speed sensor 78 is operative to sense the speed of the motor output shaft 34 and direct an electrical signal representative thereof to the microprocessor 18. A third speed sensor 80 is operative to sense the speed of the output drive shaft 26 and direct an electrical signal representative thereof to the microprocessor 18.

Referring to FIGS. 1 and 2, the methodology of the transmission control within the microprocessor 18 is shown at 90. When the key of the machine is turned on, powerup delay of the transmission control 90 occurs in module 92. At this stage power is received from the start switch but activation of the transmission is delayed until the low-level hardware self test comes up error free. If an error were detected, the startup prcedure would be suspended, and the operator would be required to turn off the power switch before normal operation is again possible. If no error is detected powerup state can be achieved even if the direction control lever 66 is not at the neutral position, however the transmission can not be activated until the direction control lever 66 is moved to the neutral position. After the necessary checks are completed the powerup command is sent to module 93 which is the neutral state monitor. The transmission ratio remains zero until the operator moves the direction control lever 66 from the neutral position. The module 93 also ensures that the machine is in a state of "true" neutral at startup. The signal for "true" neutral can only be achieved when an input from the direction control lever 66 is received stating that the lever is in neutral and a signal is received stating the motor speed is zero. A signal is sent to the hystat controls 44, also shown as module 94, to the pump to stop the motor rotation and a signal is sent to the clutch control 28, also shown as module 95, to disengage all the clutches. These signals are sent only in the event that a "true" neutral is not present when the powerup state is reached. After all inputs are determined to be correct a signal indicating the machine is in neutral is sent to module 96 which interprets the operator requests.

Module 96 computes the operator intended transmission ratio as indicated by the position inputs from the speed pedal 62, the speed range lever 70, the direction control lever 66, current transmission ratio signal from a module 97 and an operator modifiable speed range gain from a range selector table 98 and a module 100 which is a speed range modifier. Module 97 receives three input signals, transmission output speed, motor speed and transmission input speed, and outputs a current transmission ratio to module 96 and three other modules as will be described later. Module 100 gives the operator the option of selecting the sensitivity of the speed range control mechanism 68 by changing the table entries in the range selector table 98. The table entries determine the speed range lever gains, which in turn controls the speed pedal 62 sensitivities. The range control mechanism 68 has four positions, each corresponding to different sensitivities for the speed pedal 62. The range control mechanism could be continuously moveable from a minimum postion to a maximum position and not having four specified positions. The machine has a default value range selector table 98 which can be modified by the operator depressing the range increment button 72 or the range decrement button 74. Depressing both buttons 72, 74 simultaneously will return the table value to the default value. The table entry will be sent from module 100 to range selector table 98 which will send a speed range gain signal to the module 96. Module 96 will send a pedal gain signal to module 102 which is a fuzzy underspeed and overspeed control.

A module 104 receives an engine throttle signal and computes a selected engine speed signal which is sent to a module 106. Module 106 receives the selected engine speed signal and the actual transmission input speed signal and computes the difference between the two incoming signals and passes the signal as an output to the module 102. Module 102 will modify the operator generated machine speed request based upon the engine speed information from module 106, and send this modified request to module 108. Module 108 also receives a current transmission ratio signal from module 97. Module 108 compares the requested command signal with the maximum allowable rate of change, for the current transmission ratio from module 97, which are contained in table 110. The rates in table 110 are determined from the operator comfort and machine parameter perspective. If the operator inputs are not within a predetermined range of the rate tables 110, module 108 will modify the signal to the maximum or minimum allowed value within the range, if the signal is within the range no modification is needed, and sends the signal to module 94 which controls the pump and motor.

A module 112 receives a current transmission ratio signal from module 97, a current clutch signal and sends a current mode signal to the module 94 and to a module 114 which is a clutch shift scheduler. Module 114 also receives a current transmission ratio signal from module 97, a shift point signal from a clutch shift data chart 116, a current clutch signal, a clutch slip signal from a module 120 which calculates clutch slips. Module 114 determines which clutch to disengage, which clutch to engage, which clutch needs to be filled in anticipation of engagement, determines when these operation need to be completed to ensure smooth clutch changes and sends a signal to the clutch control module 95 to indicate exactly when to start clutch fill, start clutch disengagement or start clutch engagement.

The clutch slip module 120 receives a motor speed signal, a transmission output speed signal, a transmission input speed signal and calculates a clutch slip or relative speed signal. The clutch slip signal is sent to the pump/motor control module 94 and the clutch shift scheduler module 114.

Module 94 sends a target pump stroke signal to a module 122, which is the pump actuator, indicating when and how to stroke the pump and also sends a target motor stroke signal to a module 124, which is the motor actuator, indicating when and how to stroke the motor. The module 94 also sends a pump being stroked signal to a module 126 which holds the motor at a maximum stroke during pump stroke. Modules 122, 124 compute the actual numeric value that is output to the pump/motor swashplate actuating solenoids in response to the target signal supplied by module 94.

Module 95 interprets the inputs coming from module 114, which is the clutch shift scheduler, and sends a control code to a high reverse clutch actuation module 128, a high forward clutch actuation module 130, and a low clutch actuation module 132. Modules 128, 130 and 132 produce the actual numeric clutch actuation commands given to the control codes from module 95. The modules 128, 130 and 132 are programmed with the procedures to follow for clutch fill, clutch engagement and clutch disengagement.

A module 134, which is a default control, handles the machine operation in the event of a mechanical, hydraulic or electrical fault. The module 134 receives input from all sensors and fault information and sends signals to module 96, module 94 and module 95 to bring the machine into a more favorable state and restrict machine operation until the fault is corrected.

FIG. 3 is a block diagram describing the method of the present invention. According to FIG. 3, the engine speed of the transmission input, the output speed of the hydrostatic transmission and the output speed of the mechanical transmission are being monitored at step S1. At step S2, the position of the speed pedal, the position of the range selector range and the position of the position of the directional control lever are monitored. At steps S3 and S4, based on an operator request interpretation, the monitored values obtained in steps S1 and S2 are compared to a set of predetermined values read from a table. As a result of the comparison is step S4, a pedal gain signal is developed which then sent to a fuzzy controller for controlling the transmission. At S5, the hydrostatic transmission and the mechanical transmission are controlled in response to the pedal gain signal obtained in S4.

INDUSTRIAL APPLICABILITY

In operation of the subject embodiment, power is supplied to module 92, however power up is delayed until the self test is completed. When the self test is completed module 93 monitors the inputs and determines if the transmission is in neutral. with the transmission in neutral a signal is send to module 96 which allows the module to accept the operator inputs from the speed pedal 62, the directional lever 66, the range selector lever 70 and the current transmission ratio from module 97. Module 97 monitors the speed sensors 76, 78, 80 and computes the current transmission ratio which is sent to module 96. The directional control lever is moved to select a direction of travel. A signal is sent to the fuzzy control module 102 indicating the operators intent and directs the appropriate signals to the hydrostatic control 44, 94 and the clutch control 28, 95. Initially, the hydrostatic transmission 16 increases the speed of the machine by adjusting the respective displacement of the variable displacement pump 48 and the variable displacement motor 52 and then controlling the respective speed clutches 36,38,40 to continue to increase the machine speed.

In view of the forgoing, it is readily apparent that the method of controlling the split torque transmission will provide smooth and efficient operation of the transmission. The system monitors system status and operator intended inputs and controls the amount of power that is routed from the engine to the transmission output shaft and controls the optimal torque path by engaging and disengaging the appropriate clutch.

We claim:

1. A method for controlling a split torque transmission having a hydrostatic transmission and a mechanical transmission, comprising the steps of:

monitoring the speed of the transmission input, the output speed of the hydrostatic transmission, the output speed of the mechanical transmission;

monitoring the position of a speed pedal, the position of a range selector lever, the position of a directional control lever;

comparing the monitored speed, the position of the speed pedal, the position of range lever, and the position of the directional lever to a set of predetermined values read from a table based on an operator request and developing a pedal gain signal which is sent to a fuzzy controller for controlling the transmission; and controlling the hydrostatic transmission and the mechanical transmission in response to the pedal gain signal developed by monitoring the speeds of the transmission input, the output speed of the hydrostatic transmission, the output speed of the mechanical transmission, the position of the speed pedal, the position of range selector lever and the position of directional control lever.

2. The method according to claim 1 including the steps of:

monitoring a range increment button and a range decrement button to determine which button is actuated; and computing a modified signal in response to actuation of the range button.

3. A transmission control system for a split torque transmission having a hydrostatic transmission and a mechanical transmission including a microprocessor that employs closed loop transmission control, comprising;

a transmission input speed sensor having a transmission input speed signal as an output wherein the transmission input speed sensor is electrically connected to the microprocessor;

a transmission output speed sensor having transmission output speed signals as outputs of the hydrostatic transmission and the mechanical transmission wherein the transmission output sensor is electrically connected to the microprocessor;

a motor speed sensor having a motor speed signal as an output wherein the motor speed sensor is electrically connected to the microprocessor;

a speed input mechanism having a speed signal as an output signal corresponding to a desired engine speed electronically connected to the microprocessor;

a direction control input mechanism having a direction signal corresponding to a desired direction of travel electronically connected to the microprocessor;

a range selector input mechanism having a range signal corresponding to a desired range of speed electronically connected to the microprocessor; and wherein the microprocessor includes a fuzzy controller which calculates a pedal gain signal to control the split torque transmission as a function of the input signals of the speed sensors and the input mechanism.

4. The transmission control of claim 3 including a range increment button and a range decrement button for modifying the range signal.

* * * * *